United States Patent [19]

Cullen et al.

[11] Patent Number: 5,005,763
[45] Date of Patent: Apr. 9, 1991

[54] CONTAINER FOR BULK MATERIAL AND METHOD OF FABRICATION THEREOF

[75] Inventors: John S. Cullen, Buffalo; Samuel A. Incorvia, Tonawanda; Christopher S. Nigon, Orchard Park; Frederick A. Boczkowski, Tonawanda, all of N.Y.

[73] Assignee: Multiform Desiccants, Inc., Buffalo, N.Y.

[21] Appl. No.: 366,128

[22] Filed: Jun. 14, 1989

Related U.S. Application Data

[63] Continuation-in-part of Ser. No. 253,553, Oct. 5, 1988, abandoned.

[51] Int. Cl.$^5$ ............................................. A61L 9/04
[52] U.S. Cl. ........................................... 239/57; 239/55
[58] Field of Search ..................... 239/53, 54, 55, 56, 239/57, 60; 53/442

[56] References Cited

U.S. PATENT DOCUMENTS

| | | | |
|---|---|---|---|
| 2,105,551 | 1/1938 | Purdy | 239/55 |
| 3,558,055 | 1/1971 | Storchheim | 239/54 |
| 3,849,972 | 11/1974 | Pepmeier et al. | 53/329 |
| 4,157,787 | 6/1979 | Schwartz | 239/56 |
| 4,161,283 | 7/1979 | Hyman | 239/55 |
| 4,184,310 | 1/1980 | Shelby | 53/412 |
| 4,809,912 | 3/1989 | Santini | 239/57 |

Primary Examiner—Andres Kashnikow
Assistant Examiner—Christopher G. Trainor
Attorney, Agent, or Firm—Joseph P. Gastel

[57] ABSTRACT

A container for material such as desiccant, adsorbent, absorbent or the like, including a molded shell made of high density polyethylene having a cylindrical side wall and an end wall and an open end, and a permeable membrane closing the open end by extending over onto the edge of the side wall and being deformed therewith and fused thereto into a frustoconical shape. A method of attaching a membrane across an opening of an annular deformable wall including the steps of placing a disc across the opening with the disc extending outwardly beyond the wall, and deforming the outer edge of the disc and the wall simultaneously by applying heat and pressure thereto to fuse the outer edge of the disc onto the wall. A container having a shell of the above-described type wherein the permeable membrane is secured to the end of the cylindrical side wall, and the overhanging portion of the membrane is sealed to the adjacent edge of the side wall which is deformed into a frustoconical shape.

12 Claims, 3 Drawing Sheets

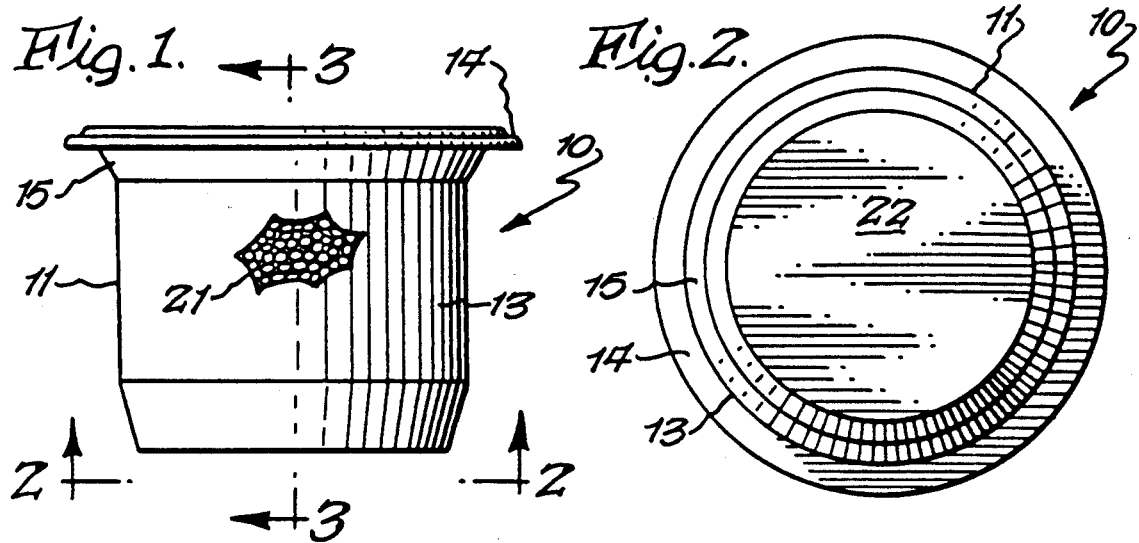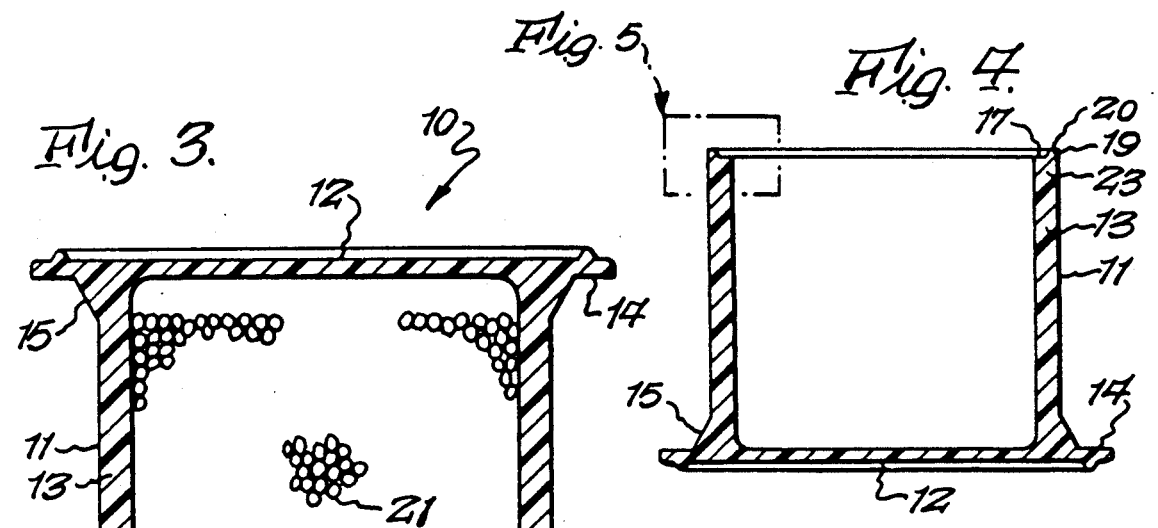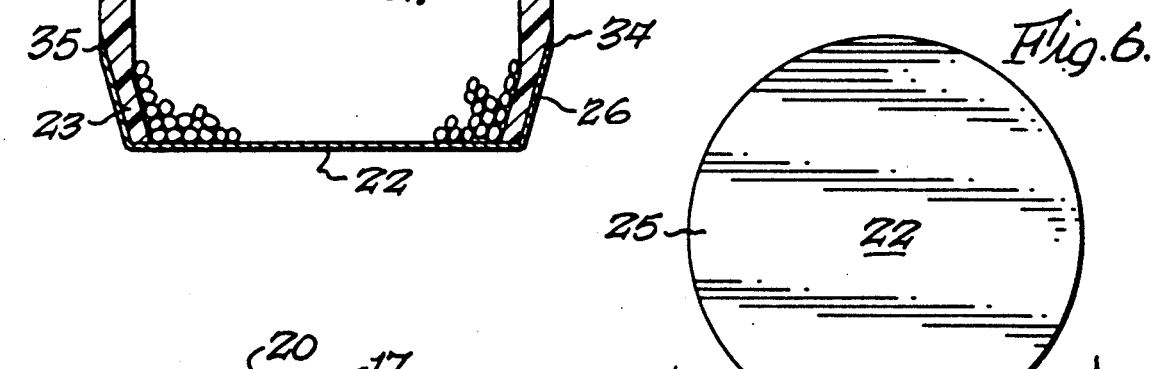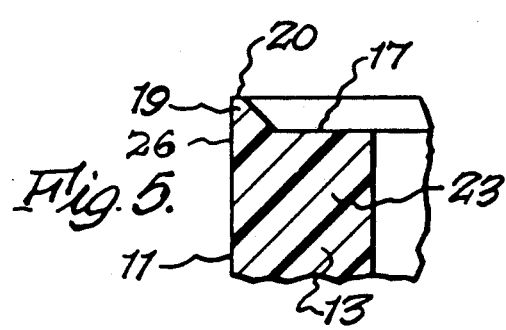

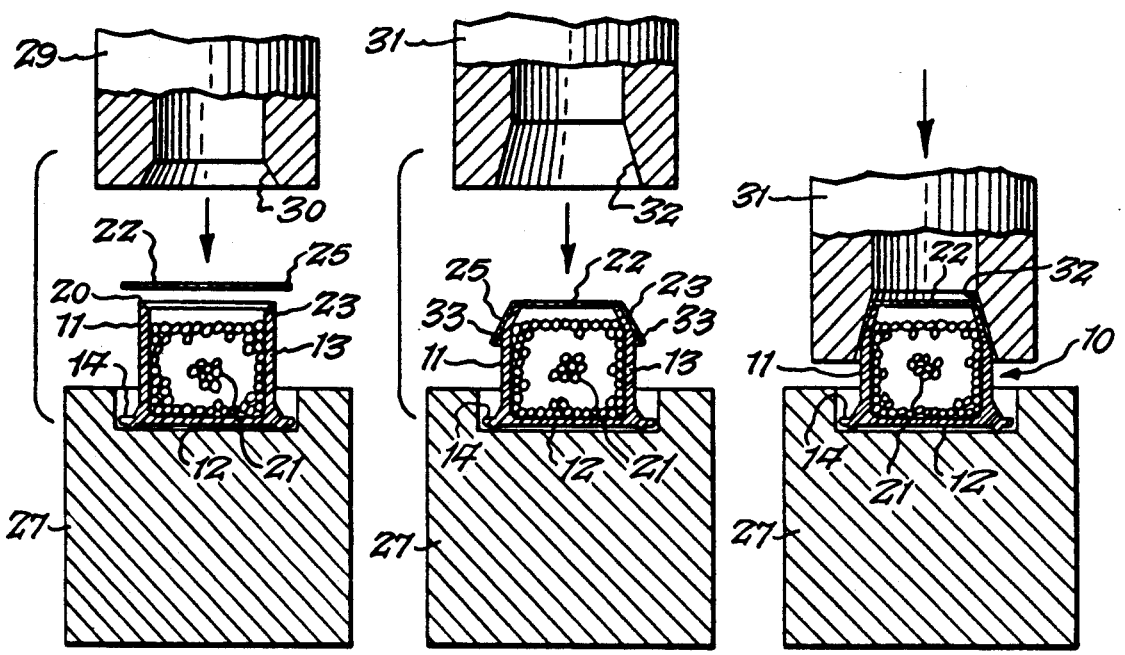
Fig. 8.  Fig. 9.  Fig. 10.
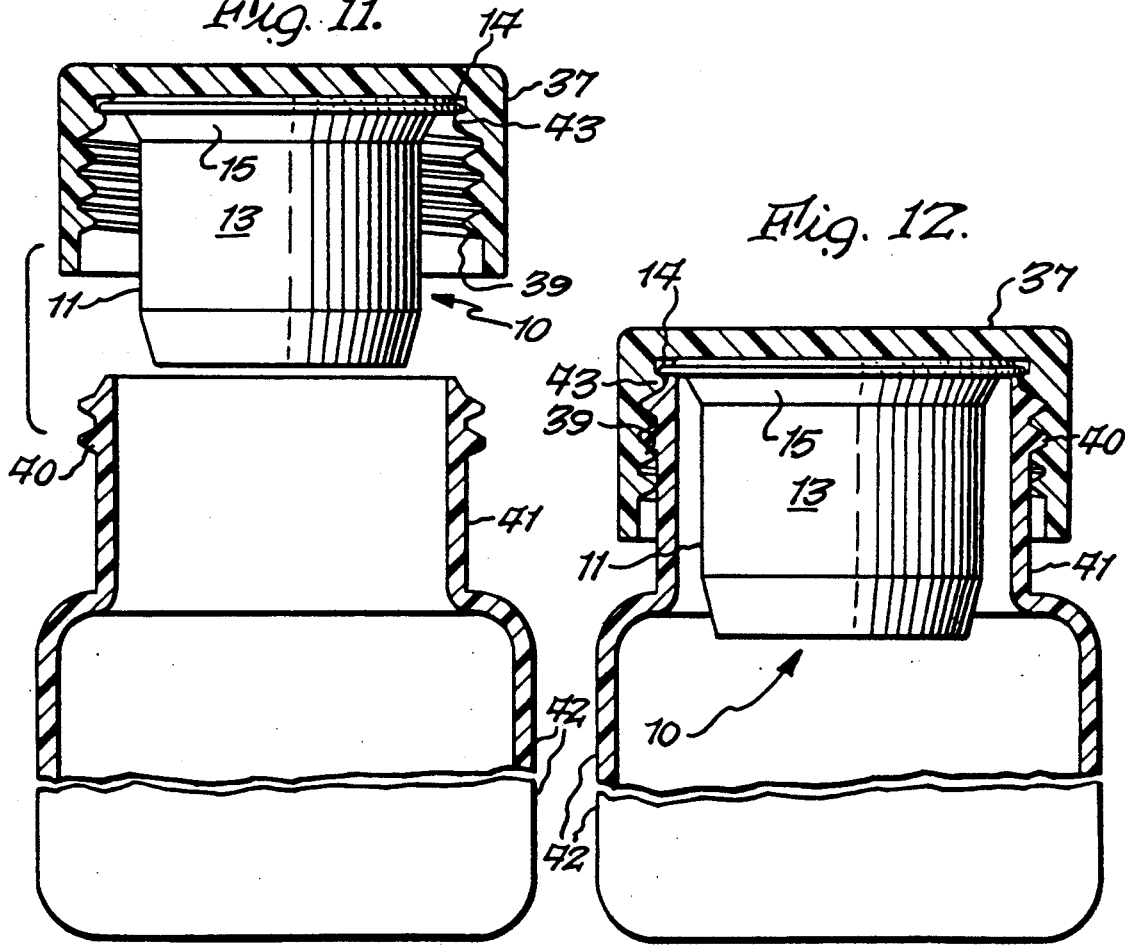
Fig. 11.
Fig. 12.

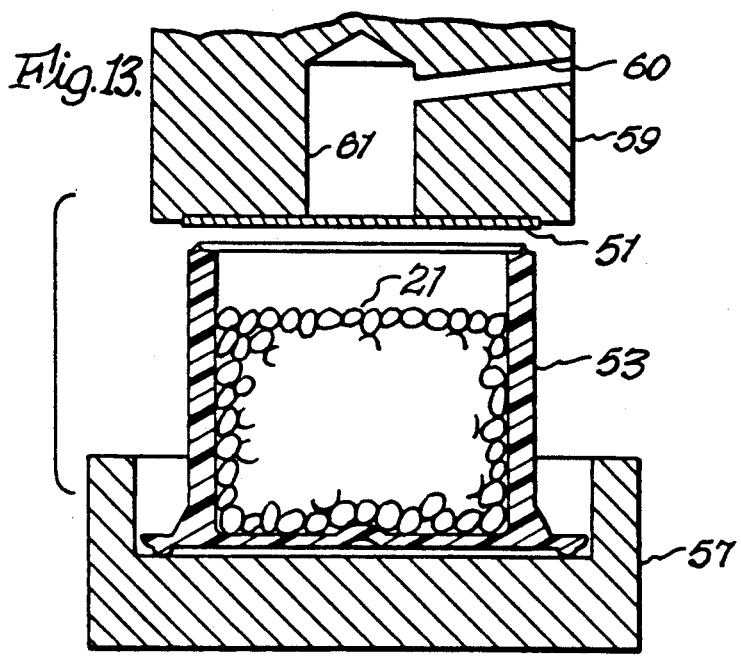
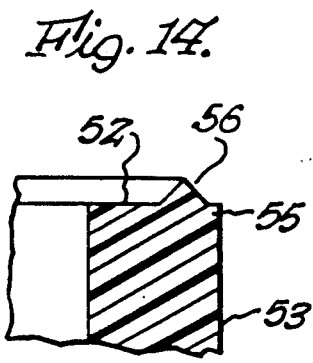
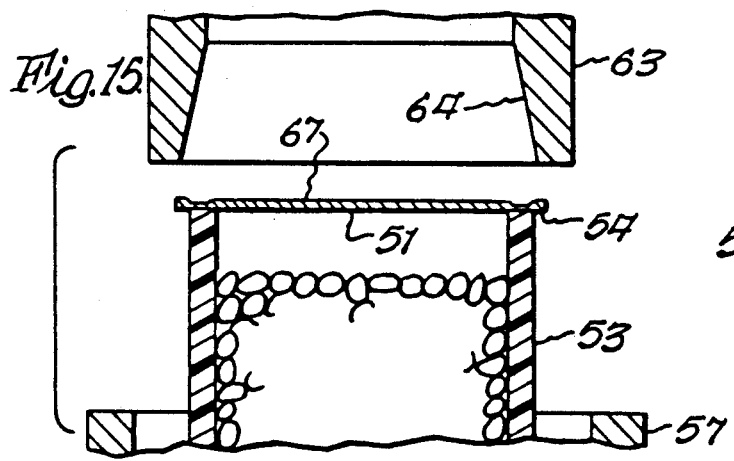
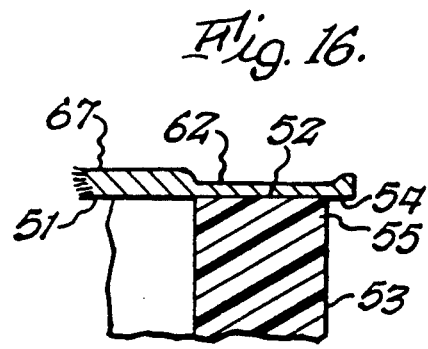
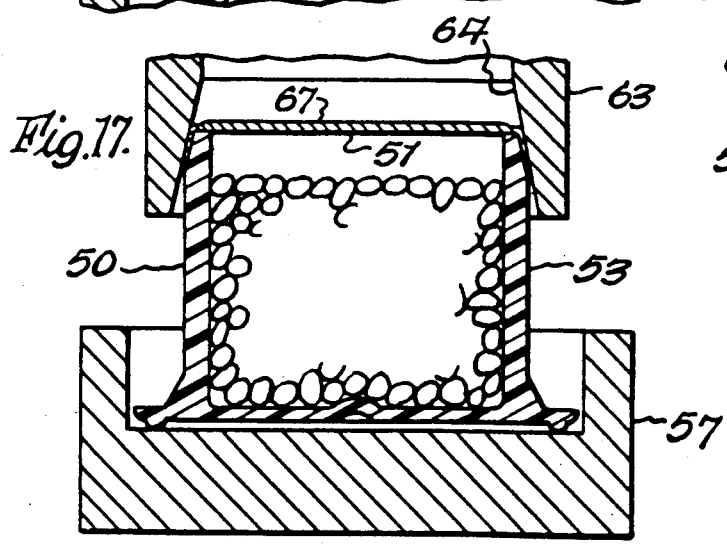
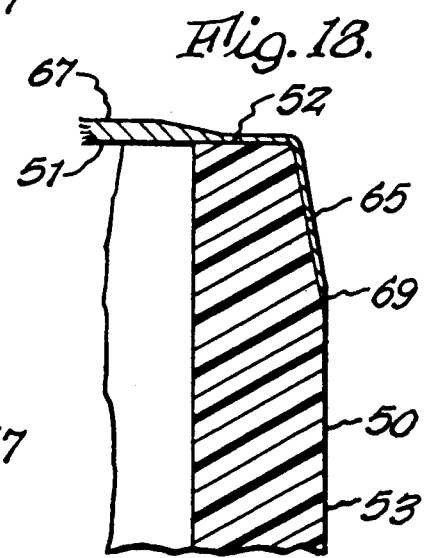

5,005,763

CONTAINER FOR BULK MATERIAL AND METHOD OF FABRICATION THEREOF

CROSS REFERENCE TO RELATED APPLICATION

The present application is a continuation-in-part of application Ser. No. 253,553, filed Oct. 5, 1988, abandoned June 8, 1989.

BACKGROUND OF THE INVENTION

The present invention relates to an improved container for bulk material such as a desiccant, adsorbent or absorbent or the like and to a method of fabrication thereof.

By way of background, various types of containers for desiccants, adsorbents and absorbents are known. Such containers are placed within a closed environment, such as a pill bottle, for removing moisture or gases therefrom, and certain types of such containers are affixed to a screw cap of the bottle.

SUMMARY OF THE INVENTION

It is one object of the present invention to provide an improved container for desiccants, adsorbents or absorbents or the like which has an unique construction and which is fabricated in an unique manner. Other objects and attendant advantages of the present invention will readily be perceived hereafter.

The present invention relates to a container for material such as a desiccant, adsorbent, absorbent, or the like, comprising a plastic shell having a wall with an inner surface and an outer surface, an opening extending transversely to said wall, an end portion on said wall proximate said opening, a first edge portion on said outer surface of said wall proximate said end portion, a permeable membrane extending transversely to said wall, a second edge portion on said permeable membrane extending onto said first edge portion and sealed thereto, and material within said inner surface of said shell on one side of said membrane for treating the environment on the other side of said membrane.

The present invention also relates to a method of attaching a membrane across an opening comprising the steps of providing a deformable wall having an outer surface and an end and a first edge portion on said outer surface proximate said end and extending transversely thereto, an opening within said end, providing a membrane of larger size than said opening, a second edge portion on said membrane, placing said membrane across said end with said second edge portion lying outwardly beyond said end, and applying a sealing die with a tapered opening to said first and second edge portions to simultaneously deform and seal together said first and second edge portions into a shape which is complementary to said tapered opening of said die.

The various aspects of the present invention will be more fully understood when the following portions of the specification are read in conjunction with the accompanying drawings wherein:

BRIEF DESCRIPTION OF THE DRAWINGS

FIG. 1 is a side elevational view, partially broken away, of the improved container of the present invention;

FIG. 2 is a bottom plan view taken substantially in the direction of arrows 2—2 of FIG. 1;

FIG. 3 is a cross sectional view taken substantially along line 3—3 of FIG. 1;

FIG. 4 is a cross sectional view similar to FIG. 3 but showing only the plastic shell before it is filled with bulk material and before it has the permeable membrane secured thereto;

FIG. 5 is an enlarged fragmentary cross sectional view of the portion of FIG. 4 which is designated by the rectangular area which is designated FIG. 5;

FIG. 6 is a plan view of the permeable membrane which is secured to the shell of FIG. 4;

FIG. 7 is a view of the permeable membrane taken substantially in the direction of arrows 7—7 of FIG. 6;

FIG. 8 is an exploded cross sectional view of one of the early steps of the method of assembly showing the shell mounted in a die base with the permeable membrane located above it and the sealing die in position to effect a sealing operation;

FIG. 9 is a view of a subsequent step in the process showing the permeable membrane sealed to the shell after the action of the die of FIG. 8 and showing a trimming die in position to trim the membrane flash off of the shell;

FIG. 10 is a view showing the die of FIG. 9 trimming the flash;

FIG. 11 is an exploded fragmentary view, partially in cross section, showing the container of FIG. 1 mounted in the cap of a bottle;

FIG. 12 is a view similar to FIG. 11 but showing the cap of FIG. 11 with the container mounted therein screwed onto the neck of the bottle;

FIG. 13 is an exploded fragmentary cross sectional view of one of the early steps in a method of assembly of a modified embodiment of the present invention;

FIG. 14 is a fragmentary enlarged cross sectional view of the outer end of the shell;

FIG. 15 is a fragmentary exploded cross sectional view of the permeable membrane secured to the outer end of the shell by the equipment of FIG. 13 and also showing the configuration of the trimming die;

FIG. 16 is a fragmentary enlarged cross sectional view of the portion of FIG. 15;

FIG. 17 is a fragmentary cross sectional view showing the blending die in position for sealing the overhanging portions of the permeable membrane to the outer edge portions of the shell; and FIG. 18 is a fragmentary enlarged cross sectional view of the sealed portion of the membrane on the outer edge portion of the shell.

DESCRIPTION OF THE PREFERRED EMBODIMENTS

The improved container 10 comprises a one-piece molded high density polyethylene shell 11 (FIG. 4) having an end wall 12 with a cylindrical side wall 13 formed integrally therewith. An annular rim 14 is essentially a continuation of end wall 12 and extends outwardly beyond cylindrical side wall 13. A thickened annular portion 15 is located at the junction of side wall 13 and end wall 12. The end 17 of wall 13 (FIG. 5) has a narrowed annular portion 19 formed thereon which terminates at a relatively narrow annular end 20.

Container 11 has bulk material 21 therein which may be a suitable desiccant adsorbent or absorbent, and without limitation, may comprise silica gel, metal alumino silicate, alumina, calcium sulfate, activated charcoal, molecular sieve, or any other compound in bead, pellet or grannular form.

Shell 11 is impermeable and a permeable membrane 22 extends across end 17 and is affixed to the outer edge 26 at end portion 23 of wall 13. As can be seen from a comparison of FIGS. 3 and 4, the end portion 23 proximate shell opening 24 is deformed from the condition of FIG. 4 to the condition of FIG. 3 during the application of the permeable membrane 22 thereto, as will be described hereafter. However, since the polyethylene material of wall 13 has a memory, the end portion 23 will have a tendency to expand outwardly from the position of FIG. 3 to the position of FIG. 4 to thus tension permeable membrane 22. This produces extreme tightness of membrane 22 to cause it to lie flat. In addition, the tension provides hoop strength to end portion 23. The annular outer edge portion 25 of permeable disc 22 is sealed to outer edge portion 26 in any suitable manner, as will be described hereafter, which may include ultrasonic welding or impulse welding or it may be effected by any other process which will provide good sealing therebetween.

The method of fabricating container 10 is depicted in FIGS. 6-10. More specifically, shell 11, which is preferably a high density polyethylene, but which may be of any other suitable plastic, is placed in die base 27, as shown, and bulk material 21 is placed therein. A circular permeable disc 22 which is preferably a spun-bonded polyolefin known under the trademark TYVEK is placed on the upper rim of shell 11 resting on reduced annular end 20. The plastic shell 11 and disc 22 have melting temperatures which are sufficiently close to each other so that when they are subjected to heat, their contacting portions will fuse. A sealing die or horn 29 includes an internal frustoconical surface 30 which is brought down onto disc 22. Since the outer annular portion 25 of disc 22 is lying on narrow end portion 20, the ultrasonic or impulse energy will be concentrated at this narrow area of contact to provide a good seal therewith on end 17. In addition, as the die 29 is moved downwardly, the annular end 23 will be deformed from the condition of FIG. 8 to the condition of FIG. 9, as will the outer annular edge 25 of disc 22. Furthermore, the application of pressure and generation of heat will cause a fusion between the contacting portions 26 and 25. Additionally, since the polyethylene shell 11 has a memory, annular end 23 will tend to somewhat return to its original condition of FIG. 4, and thus will tension disc 22 which in turn provides hoop strength to end portion 23. The heat and pressure experienced during the sealing operation will also cause the outer edge 25 of disc 22 to lie smoothly on shell edge 26.

After the foregoing attachment has taken place, a trimming die 31 is moved from the position of FIG. 9 to the position of FIG. 10. Its frustoconical inner surface 32 is of a steeper slope than frustoconical surface 30 and it will trim the flash 33 from the extreme outer portions of outer edge 25 so that there will be a neat junction 34 (FIG. 3) between the extreme outer edge 35 of disc 22 and the adjacent outer surface 26 of wall 13. More specifically, frustoconical surface 30 may be at about a 60° angle, and frustoconical surface 32 may be at about a 26° angle. The exact angularity would depend on a number of factors and must be calculated so that trimming horn 31 merely trims the flash 33. By way of example and not limitation, the disc 22 may be fabricated of a material known under the trademark TYVEK 107B and its melting temperature may be approximately 275° F. The melting temperature of the high density polyethylene shell is approximately 275° F.

The thickness of wall 13 is approximately 0.060 inches before it has been deformed.

In use, the container 10 is intended to be held within a cap 37 having an internal screw thread 39 which threads onto external thread 40 on neck 41 of bottle 42 which may contain material such as pills, capsules or any other item which has to be in an atmosphere within the container from which moisture or other gases are removed. The outer flange 14 of container 10 is trapped behind ledge 43 within cap 37 and is thus retained therein. The flange or annular rim 14 can be placed in the position of FIGS. 11 and 12 because rim 14 is flexible and thus can be pushed into this position.

If desired, narrowed annular portion 19 may be eliminated, in which event end 17 would extend straight across to outer edge 26.

In FIGS. 13-18 a modified method and container 50 are shown. In this method, after shell 53 has been filled with the material 21 of the type described above, the permeable circular membrane 51 is first sealed to the extreme outer annular end portion 52 of shell 53 before the overhanging annular portion 54 is sealed to the outer annular edge portion 55. In this respect, the shell 53, which may be identical to shell 11 described above or which has an annular triangular ridge 56 for concentrating heat and pressure during sealing, is placed into a die base 57. A sealing die 59 is provided on which membrane 51 is held by applying suction to conduit 60 which is in communication with bore 61. Membrane 51 is substantially identical to membrane or disc 22 described above. After die 59 has pressed and sealed the outer edge portion 62 to end surface 52 by heat and pressure (FIG. 16), die 59 is withdrawn. There will be an annular overhang 54 which extends outwardly beyond the outer surface of wall 53. Thereafter, a blending horn 63, which has a frustoconical internal surface 64 is brought downwardly as shown in FIG. 17 to seal the overhang 54 by heat and pressure about edge portion 55 which is also slightly deformed to the frustoconical condition shown at 65 in FIG. 18. The outer annular portion 54 of membrane 51 is not trimmed; it is merely blended into the outer annular portion 55 of shell 53 which is deformed to the condition shown in FIG. 18. Thus, the central portion 67 of membrane 51 is not tensioned, as in FIGS. 1-12, but there is a double seal at two positions, namely, at 62 and at surface 65. Furthermore, there is a substantially flush edge at 69.

It can thus be seen that the improved container and method are manifestly capable of achieving the objects of the present invention, and while preferred embodiments have been disclosed, it will be appreciated that the present invention is not limited thereto but may be otherwise embodied within the scope of the following claims.

What is claimed is:

1. A container for material such as a desiccant, adsorbent, absorbent, or the like, comprising a molded plastic shell having a wall with an inner surface and an outer surface, an opening extending transversely to said wall, an end portion on said wall proximate said opening, a first edge portion of frustoconical configuration on said outer surface of said wall proximate said end portion, a permeable membrane extending across said opening transversely to said wall, an inner edge portion on said permeable membrane fused to said end portion of said wall, an outer edge portion of frustoconical configuration on said permeable membrane extending onto said first edge portion of frustoconical configuration and fused in frustoconical mating relationship therewith, and said material within said inner surface of said shell on one side of said membrane for treating the environment on the other side of said membrane by desiccation, adsorption, absorption, or the like, said outer edge portion on said permeable membrane being formed to said mating frustoconical configuration with said first edge portion on said outer surface of said wall incidental to effecting said fusion therebetween.

2. A container as set forth in claim 1 wherein said permeable membrane is under tension and thereby provides hoop strength to said first edge portion.

3. A container as set forth in claim 1 wherein said wall is substantially cylindrical.

4. A container as set forth in claim 1 wherein said end portion on said wall includes a flat surface, and wherein said inner edge portion on said permeable membrane is fused to said flat surface.

5. A container as set forth in claim 4 wherein said plastic shell has a longitudinal axis, and wherein said flat surface extends substantially perpendicularly to said longitudinal axis and wherein said inner edge portion is fused substantially entirely across said flat surface.

6. A container as set forth in claim 4 wherein said outer edge portion of said permeable membrane is of a size wherein its extreme outer edge is blended into said first edge portion of frustoconical configuration of said shell at the location where said first edge portion of frustoconical configuration merges into the remainder of said wall.

7. A container as set forth in claim 1 wherein said plastic shell and said permeable membrane have melting temperatures which are sufficiently close to each other so as to cause their contacting portions to fuse.

8. A container for material such as a desiccant, adsorbent, absorbent, or the like, comprising a molded plastic shell having a wall with an inner surface and an outer surface, an opening extending transversely to said wall, an end portion on said wall proximate said opening, a first edge portion of frustoconical configuration on said outer surface of said wall proximate said end portion, a permeable membrane extending across said opening transversely to said wall, an outer edge portion of frustoconical configuration on said permeable membrane extending onto said first edge portion of frustoconical configuration and fused in frustoconical mating relationship therewith, an extreme outer edge on said outer edge portion of said permeable membrane blended into said first edge portion of frustoconical configuration of said shell at the location where said first edge portion of frustoconical configuration merges into the remainder of said shell, and said material within said inner surface of said shell on one side of said membrane for treating the environment on the other side of said membrane by desiccation, adsorption, absorption, or the like, said outer edge portion on said permeable membrane being formed to said mating frustoconical configuration with said first edge portion on the outer surface of said wall incidental to effecting said fusion therebetween.

9. A container for material such as a desiccant, adsorbent, absorbent, or the like, comprising a molded plastic shell having a wall with an inner surface and an outer surface, an opening extending transversely to said wall, an end portion on said wall proximate said opening, a first edge portion of frustoconical configuration on said outer surface of said wall proximate said end portion, a permeable membrane extending across said opening transversely to said wall, an inner edge portion on said permeable membrane fused to said end portion of said wall, an outer edge portion of frustoconical configuration on said permeable membrane extending onto said first edge portion of frustoconical configuration and fused thereto, and said material within said inner surface of said shell on one side of said membrane for treating the environment on the other side of said membrane by desiccation, adsorption, absorption, or the like, said end portion including a narrow portion as a part thereof, and wherein said inner edge portion of said permeable membrane is fused to said narrow portion.

10. A container as set forth in claim 9 wherein said end portion includes a flat surface, and wherein said inner edge portion of said permeable membrane is also fused to said flat surface.

11. A container for material such as a desiccant, adsorbent, absorbent, or the like, comprising a molded plastic shell having a wall with an inner surface and an outer surface, an opening extending transversely to said wall, an end portion on said wall proximate said opening, a first edge portion of frustoconical configuration on said outer surface of said wall proximate said end portion, a permeable membrane extending across said opening transversely to said wall, an inner edge portion on said permeable membrane fused to said end portion of said wall, an outer edge portion of frustoconical configuration on said permeable membrane extending onto said first edge portion of frustoconical configuration and fused thereto, and said material within said inner surface of said shell on one side of said membrane for treating the environment on the other side of said membrane by desiccation, adsorption, absorption, or the like, said outer edge portion including an extreme outer edge which is trimmed.

12. A container for material such as a desiccant, adsorbent, absorbent, or the like, comprising a molded plastic shell having a wall with an inner surface and an outer surface, an opening extending transversely to said wall, an end portion on said wall proximate said opening, a first edge portion of frustoconical configuration on said outer surface of said wall proximate said end portion, a permeable membrane extending across said opening transversely to said wall, an outer edge portion of frustoconical configuration on said permeable membrane extending onto said first edge portion of frustoconical configuration and fused in frustoconical mating relationship therewith, and said material within said inner surface of said shell on one side of said membrane for treating the environment on the other side of said membrane by desiccation, adsorption, absorption, or the like, said outer edge portion on said permeable membrane being formed to said mating frustoconical configuration with said first edge portion on the outer surface of said wall incidental to effecting said fusion therebetween.

* * * * *